3,368,132
INDUCTION MOTOR CONTROL FOR
STARTING CONVEYOR BELT
Peter de H. Eastcott and Robert N. Rollwagen, Peterborough, Ontario, Canada, assignors to Canadian General Electric Company, Limited, a corporation of Canada
Filed Sept. 18, 1964, Ser. No. 397,576
6 Claims. (Cl. 318—229)

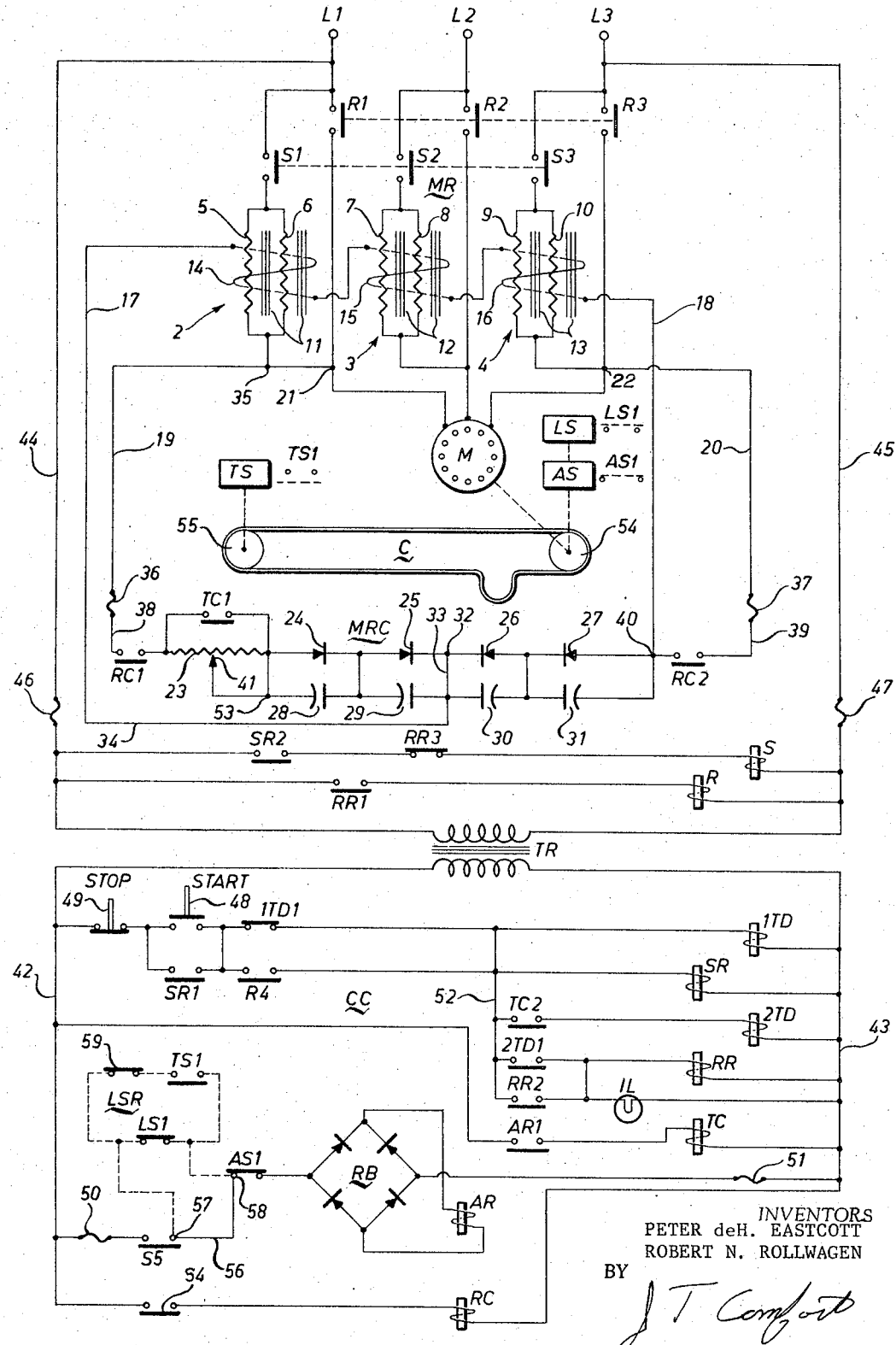

ABSTRACT OF THE DISCLOSURE

A reduced voltage motor control for controlling the starting of a squirrel cage induction motor coupled to the head end of a conveyor belt, an acceleration sensitive switch connected in cooperation with the motor control so that during starting of the drive motor the power supplied from a power source through a reduced voltage portion of the control to the motor is interrupted whenever acceleration of the head end of the conveyor belt exceeds a predetermined level and is restored when the acceleration has returned to acceptable limits.

The intermittence of application of power supplied decreases with an increase of speed of the conveyor belt until such time when the duration between interruptions is great enough for a timing relay to cause the motor to be directly connected to the power source.

---

This invention relates to a system for controlling the speed of an alternating current motor during the starting thereof.

There are certain electric motor driven machines where the starting of the motor requires special control in view of the nature of the load, but once the machine attains full speed the motor continues to operate in the usual way. Two examples of such machines are conveyor belts and turbine type compressors.

Generally, a belt-type conveyor cannot be started in the same way as most electric motor driven loads because the belt constitutes a large, unwieldy mass resting along its length on a large number of rollers, all of which tends to resist starting. Moreover, the belt is an extremely elastic member which tends to stretch before it begins to move; this stretching and subsequent incremental movement begins at the drive pulley and progresses therefrom along the tuat side of the belt. If the belt is very long and the drive pulley is accelerated too rapidly, it is possible for the driven end of the belt to be moving at a substantial rate of speed, or even at full speed, before the other end of the belt begins to move, in which case the belt accumulates a large amount of energy from being stretched abnormally. Once the last of the static friction of the system has been overcome, the stretched belt will tend to snap back to the length it would normally be for the particular operating conditions, and in so doing, it will release suddenly its stored energy to rapidly accelerate the retarded portions of the conveyor system. This sudden contraction of the belt can cause it to oscillate severely and thereby damage the belt as well as other components of the conveyor system. If the belt is loaded with material such as crushed rock, chunks of rock may be thrown from the belt and strike personnel or other equipment in the the vicinity of the conveyor system. Moreover overstretching the belt may weaken or even break it and thereby damage other components of the conveyor system as well. Therefore, elaborate means are often provided to obtain safe starting of a conveyor belt drive.

One well known drive for a belt type conveyor system uses either a fluid or an electromagnetic coupling to control starting of the system. In this particular system an alternating current induction motor drives the input element of the coupling, and the output element of the coupling drives the conveyor. Hence, the motor can be brought up to full speed where it can develop full load torque before it is required to start the load. Fluid and electromagnetic couplings having the characteristics necessary for starting belted conveyors are readily available, as are the means for controlling such couplings to obtain proper starting of the conveyor.

In one prior art system, the drive is accelerated gradually up to a slow speed which is a fraction of full speed, and it is held at this slow speed for a definite period of time sufficient to allow the whole belt to attain this slow speed. After the whole belt operates at the slow speed, the drive is accelerated again to gradually bring operation of the conveyor belt up to full speed at a controlled rate of acceleration. The foregoing prior art system has proven to be satisfactory, but it is considered by us to be more elaborate and consequently more expensive than warranted for many conveyor belt applications, chiefly because fluid and electromagnetic couplings are relatively expensive items.

We have found that a fluid or an electormagnetic coupling can be dispensed with in the drive, and an induction motor coupled directly to drive a belted conveyor, or other apparatus requiring similar control of starting, when our novel control system is employed. An embodiment of our system will now be described with reference to the single drawing figure which is an elementary wiring diagram of a motor starting circuit embodying our invention.

In the control system shown in the drawing, a squirrel cage induction motor M is coupled mechanically to drive a load C from its lead end 54, which end in turn is coupled mechanically to drive a rate of acceleration switching device AS. For purposes of the description to follow the load will be referred to as a conveyor belt, i.e., a belt for conveying materials in bulk from one location to another, as for example crushed rock, gravel, sand, coal, etc. Because a conveyor belt is usually a heavy load to start and bring up to full operating speed, the induction motor used will preferably be of a three phase type having a relatively high starting torque. Line leads L1, L2 and L3 complete an electrical circuit to a source of alternating current such as a three phase, 60 cycle, 550 volt supply. The primary of motor M can be energized from this source through a bank of reactors designated MR by closing contacts S1 to S3 or it can be energized directly from the power source by closing contacts R1 to R3. During the motor starting cycle. i.e. from standstill to approximately full operating speed, contacts R1 to R3 remain open while the reactors exercise control over the current supplied to the primary of the motor through closed contacts S1 to S3.

The reactor bank MR comprises three identical saturable reactors 2, 3 and 4 of a suitable type and rating. It is to be noted that to control the operation of an induction motor by means of saturable reactors in its primary circuit is well known. The type and rating of the reactors selected will be determined chiefly by the characteristics of the induction motor and the performance expected of it. Although three reactors appear in FIGURE 1 and in the description to follow, it is possible to achieve an acceptable degree of control in certain applications with two reactors only, i.e., reactors in circuit with two lines only rather than all three lines. Reactor 2 has a pair of parallel connected windings 5, 6 in series with contacts S1 and this combination is connected in parallel with contacts R1. Reactor 3 has a similar arrangement of alternating current windings 7, 8 and contacts S2 across contacts R2; and reactor 4 also has the same arrangement of windings 9, 10 and contacts S3 across contacts R3. Reactor 2 has its windings 5 and 6 on a common magnetic core 11 which is also linked by a control winding 14; reactor 3 has its windings 7 and 8 on a common magnetic core 12 which is also linked by a control winding 15; and reactor 4 has its windings 9 and 10 on a common magnetic core 13 which is also linked by a control winding 16. Control winding 14, 15 and 16 are connected together, preferably in series as illustrated, to receive unidirectional current from a reactor control circuit MRC. Leads 17 and 18 connect control circuit MRC to the control windings of the reactors, and leads 19 and 20 connect the control circuit to the alternating current supply at points 21 and 22 intermediate the motor and reactors 2 and 4.

Control circuit MRC converts alternating current into unidirectional current which is passed through control windings 14, 15 and 16 whereby unidirectional magnetic flux is induced in cores 11, 12 and 13 of reactors 2, 3 and 4 respectively. The value of this control current is selected to produce a desired flux density in the cores, which flux may completely or partially saturate the cores. As is well known this flux alters the reactive component of the impedance offered by the other windings to the flow of alternating current therethrough, i.e., increases in this flux reduce the impedance until at complete saturation of the cores the impedance becomes substantially all resistance. Hence windings 5 to 10 will allow more current to flow from lines L1 to L3 to the primary of motor M when control windings 14 to 16 are energized than when the control windings are deenergized, and maximum A.C. current will flow when cores 11 to 13 are fully saturated by current flow in the control windings.

Reactor control circuit MRC comprises essentially a rectifying means for converting alternating current to unidirectional current, a resistor 23 for limiting the flow of unidirectional current to control windings 14 to 16 to a predetermined low level of flux in the reactor cores, and normally open contacts TC1 which are closed intermittently to short circuit resistor 23 and thereby allow pulses of unidirectional current to flow through the control windings, which pulses are sufficient in magnitude to saturate the reactor cores to predetermined levels. Of course, to energize circuit MRC contacts RC1 and RC2 must be closed as will be described later on. During the intervals of such saturation, the flow of A.C. to the primary of motor M is high and consequently the motor accelerates rapidly. Device AS responds to the rate of acceleration of the drive and cooperates with a control circuit CC to be described later in maintaining the rate of acceleration below a predetermined limit.

Conveniently, the rectifying means may comprise a first pair of serially connected silicon diodes 24 and 25 which function as a half-wave rectifier of the alternating current, and a second pair of serially connected diodes 26 and 27 which are connected back-to-back with respect to the first pair of diodes and which function in the manner of a flywheel in the circuit. Because the circuit illustrated is intended for use on 550 volts, two rectifiers are placed in series for each pair, but on a somewhat lower voltage one rectifier could be used in place of a pair. Rectifiers 24 and 25 conduct half cycles of the relatively small alternating current flow through the resistor 23, and during the interval that contacts TC1 are closed, this current flow increases very substantially to a value high enough to produce the required level of saturation in cores 11 to 13. Beginning at point 35 on the motor side of reactor 2, alternating current flows through conductor 19, protective fuse 36, conductor 38, contacts RC1, the parallel combination of resistor 23 and contacts TC1, rectifiers 24 and 25 which convert it to unidirectional current, terminal point 32, conductors 33, 34 and 17, reactor control windings 14, 15 and 16, conductor 18 to terminal point 40, contacts RC2, conductor 39, protective fuse 37, and conductor 20 to point 22 at the motor side of reactor 4. Rectifiers 26 and 27 block the flow of current from point 32 directly to point 40. During the half-cycle when rectifiers 24 and 25 do not conduct current, the magnetic field induced in cores 11, 12 and 13 by the previous half-cycle collapses, whereby a voltage is induced in the control windings, which voltage causes current to flow from these windings through conductor 18 to point 40, through rectifiers 27 and 26 to point 32 where its flow is blocked by rectifiers 25 and 24, from point 32 through conductors 33, 34 and 17 back to windings 14 to 16. Hence the presence of rectifiers 26 and 27 tends to sustain the current flow in the control windings and therefore the flux in the cores. This arrangement produces a smoother wave form than is possible with a half-wave rectifier and requires only half as many rectifier cells as a fullwave, bridge-type network. Capacitors 28, 29, 30 and 31 across rectifiers 24, 25, 26 and 27 respectively serve to further smooth out the wave form of the unidirectional current. It is possible to select a suitable minimum flow of current through resistor 23 by simply altering the position of sliding contact 41. The value of resistor 23 will be determined by this minimum current flow and also by the degree of arc suppression desired at contacts TC1.

As stated previously, device AS senses the rate of acceleration of load C as it is being brought up to speed. A suitable device is described and claimed in a United States Patent 3,267,228 which issued Aug. 16, 1966, P. Eastcott and assigned to the same assignee as the present application. In essence, this device comprises a flywheel supported for rotation and a member also supported for rotation and driven by the load. The member is coupled to the flywheel by a spring and the arrangement is such that the flywheel follows the member so long as the rate of acceleration of the member is within preset limits. When the acceleration of the member exceeds this preset rate, the flywheel lags behind the member. i.e. the flywheel is displaced angularly with respect to the member. This displacement opens a pair of normally closed contacts. So long as the member and flywheel rotate in synchronism, the contacts remain closed. Hence the contacts are open only when the flywheel is out of step with the member.

The system and operation thereof for starting and controlling acceleration of the drive will be described now. The control circuit indicated generally by reference to characters CC includes a plurality of electrical components adapted to be energized from buses 42 and 43 which are connected to the secondary of step-down transformer TR; the primary of this transformer is connected to lines L1 and L3 via leads 44 and 45 which include current limiting fuses 46 and 47.

To start the motor, "start" button 48 is depressed momentarily, thereby energizing start relay SR from buses 42 and 43 through normally closed "stop" button 49, "start" button 48, and normally closed contacts 1TD1, whereupon normally open contacts SR1 of relay SR close to lock relay SR in a circuit between buses 42 and 43 by way of "stop" button 49, contacts SR1 and 1TD1. Bus 52 is now energized and will remain energized until the circuit established to this bus is broken, as for example by depressing "stop" button 49. Simultaneously with the closing of contacts SR1, normally open contacts SR2 of relay SR close also to energize contactor S from lines 44 and 45 via contacts SR2 and normally closed contacts RR3. Normally open contacts S1 to S5 of contactor S now close; the interlocked contacts S1 to S3 place the bank of reactors MR on power lines L1 to L3 and current can now flow from the power lines through reactor windings 5 to 10 to the primary of motor M; contacts S4 complete a circuit from buses 42 and 43 to relay RC; and contacts S5 complete a circuit from buses 42 and 43 to a full-wave bridge-type rectifier RB via current limiting fuses 50 and 51, contacts S5 and normally closed contacts AS1 of rate of acceleration device AS. Relay RC now closes its normally open contacts RC1 and RC2, whereby reactor control circuit MRC is connected to its power source.

At the time that "start" button 48 is pressed, relay 1TD is also energized and thereafter locked-in by the hold circuit established for relay SR. Relay 1TD incorporates a time delay feature, therefore this relay does not actuate its contacts until a specific period of time has elapsed. The time delay built into the relay is sufficient under normal conditions to allow motor M to achieve full operating speed before the relay times out, and opens its normally closed contacts 1TD1. If abnormal conditions are encountered during the starting cycle, and as a result the motor fails to achieve the necessary operating speed in the time allotted, relay 1TD times out, whereupon contacts 1TD1 open before contacts R4 close, thereby shutting down the system. Contacts R4 are auxiliary contacts on the main contactor, which contactor upon satisfactory completion of the starting cycle places the motor directly on the power line and in so doing closes contacts R4 to maintain the circuit from bus 42 to bus 52. After a system shut-down by relay 1TD, the starting procedure must be repeated to restart the motor.

Since at the very beginning of the starting cycle, contacts TC1 are open, the bank of reactors MR offer maximum impedance to the alternating current flow from lines L1 to L3 to the primary of motor M. Therefore, the motor develops little torque for a very brief interval until control MRC takes over. However, at the time that contacts S5 closed, relay AR was energized with direct current from rectifier RB and it in turn closed its normally open contacts AR1 to place relay TC across buses 42 and 43. Relay TC is energized from buses 42 and 43 as often as contacts AR1 close and is deenergized as often as contacts AR1 open. Since the condition of contacts AR1 and hence the condition of contacts TC1 depend on the condition of contacts AS1 alternately will cause relay TC to open and close its contacts in step with the movement of contacts AS1. By following the contact movement of the rate of acceleration device in this way, relay TC simulates the action of a device well known in the art as a "Tirrill" regulator wherein normally open contacts are adapted to oscillate cyclically between make and break positions when the regulator is energized. Hence contacts TC1 pass current in spurts to reactor control MRC, wherefrom reactor cores 11 to 13 become saturated intermittently to allow intermittent unrestricted flow of alternating current to the motor. An increase in current flow to the motor is reflected in a corresponding increase in the torque developed by the motor and consequently the rate at which the motor is able to accelerate the load. One must appreciate that the reactors and the controls therefor must be engineered to suit the starting characteristics of the motor and the starting performance required of it. Preferably, the system is designed such that under normal starting conditions the motor is capable of delivering a little more torque than is necessary to accelerate the load at the rate set on device AS, and the set rate of acceleration is maintained by device AS in a way to be described. With a load such as a conveyor belt, the belt may be started unloaded, partially loaded, or fully loaded, hence an excess of motor starting torque is desirable.

During acceleration of the drive, contacts AS1 may be either open or closed depending on the rate at which the drive is accelerating. If the rate of acceleration is below the rate set on device AS, the contacts are closed, but if it is above the set rate, the contacts are open. Hence contacts AS1 may oscillate rapidly and sometimes do, but these oscillations will not appear in the control system because relay AR is of a type which will not respond to momentary current interruptions, that is, contacts AS1 must interrupt the current flow to relay AR for a definite short period of time before relay AR actuates its contacts AR1. This delay interval is long enough that bounding of contacts AS1 will not lead to bouncing of contacts AR1. However, when contacts AS1 open for a period of time in excess of a bouncing condition, relay AR is deenergized, contacts AR1 open to deenergize relay TC. Once relay TC is inoperative, the reactors desaturate to reduce the flow of alternating current to the primary of motor M to a minimum level. If this occurs early in the starting cycle when the torque required of the motor is still great, the rate at which the motor can accelerate the load drops quickly, contacts AS1 reclose and relay TC becomes operative once more. However, when the speed of the drive approaches its normal operating speed, the torque which the motor is required to develop decreases to the extent that the acceleration of the drive will be at a very low level, and as a result contacts AS1 in the rate of acceleration device will remain closed long enough for the control system to transfer the power supply to the motor directly to lines L1 to L3.

During the time that contacts TC1 of relay TC are closed, contacts TC2 of this relay are closed too. Therefore relay 2TD is connected intermittently between buses 52 and 43 and receives spurts of current therefrom. So long as the current flow to relay 2TD is intermittent, the relay does not actuate its normally open contacts 2TD1, but when the flow of current becomes steady for a set period of time (e.g. three seconds) relay 2TD times out and closes its contact 2TD1 for a brief interval of time. During the time that contacts 2TD1 are closed, relay RR is energized from buses 52 and 43, whereby contacts RR2 close to complete a holding circuit for relay RR between buses 52 and 43. Simultaneously with the closing of contacts RR2, contacts RR3 open and contacts RR1 close, contacts RR3 being normally closed and contacts RR1 normally open. When contacts RR3, open relay S is deenergized, and contacts S1 to S5 open. Therefore, reactors MR are disconnected from lines L1 to L3; the rate of acceleration device, relays AR and TC are disconnected from buses 42 and 43; and relay RC is disconnected from buses 42 and 43 and consequently contacts RC1 and RC2 open to disconnect control MRC from lines 19 and 20. When contacts RR1 close, contactor R is energized and closes its contacts R1 to R3 to connect the primary of motor M directly to lines L1 to L3. At the time that contacts 2TD1 and subsequently contacts RR2 closed, indicator lamp IL was turned on to provide a visual indication to the operator that the starting cycle had been completed satisfactorily and that the drive is now operating at normal speed.

The motor is stopped in the usual way by depressing "stop" button 49 momentarily to deenergize the system, after which the motor and its load may be allowed to come to rest with or without braking as deemed necessary. The moment that button 49 is depressed, relay SR is deenergized whereby the holding circuit provided by contacts SR1 is broken and the power removed from bus 52. Once bus 52 is deenergized, the remainder of the control system is also deenergized.

In a conveyor belt installation where the belt is very long, it may be desirable to bring the drive mechanism for the belt up to a low rate of speed of say 10% of the rated speed of the drive and hold it at this low speed until the entire belt is operating at the low speed. Once the entire belt is in motion, the comparatively large static forces due to friction and inertia have been overcome to the extent that the system can now be brought up to full speed at a reasonable rate of acceleration without fear of overstretching the belt. The system described with reference to the single drawing figure may be adapted for two stage starting through the following additions and alterations:

(1) A switch LS responsive to speed is coupled mechanically to be driven by the head end 54 of conveyor C in the same way as device AS;

(2) A switch TS responsive to speed is coupled mechanically to be driven by the tail end 55 of conveyor C.

(3) Conductor 56 interconnecting switch contacts S5 and AS1 is removed and replaced with the circuit LRS shown in dotted lines and connected to points 57 and 58; and (4) Preferably, resistor 23, sliding contact 41 and the conductor connected between point 53 and contact 41 should all be removed from reactor control circuit MRC so as to leave contacts TC1 directly in series with the rectifier-capacitor combination.

The low speed running circuit LSR comprises a set of normally closed switch contacts 59 which can be actuated manually or otherwise by an operator, a set of contacts TS1 of the speed responsive switch TS driven by the tail end 55 of the conveyor and a set of contacts LS1 of the speed responsive switch LS driven by the head end 54 of the conveyor. Contacts TS1 are normally open at speeds below a speed preset in switch TS, and contacts LS1 are normally closed at speeds below a speed preset in switch LS. Contacts 59 and TS1 are connected in series, the series combination of contacts 59 and TS1 is connected in parallel with contacts LS1 and the series parallel combination is connected across the points 57 and 58 from which conductor 56 has been removed.

The operation of the modified system will now be described. When the low speed running circuit LSR is employed, the system starts and accelerates to the aforementioned low rate of speed, e.g., about 10% of the rated speed of the drive, in the way described earlier. However, when the head end 54 of the conveyor reaches the low rate of speed at which switch LS is set to operate, contacts LS1 open and deenergize contacts AS1 and relays AR and TC. Since contacts TC1 are now open to unidirectional current can flow from rectifiers 24, 25 to control windings 14 to 16 to saturate cores 11 to 13 of reactor bank MR, and as a result the reactors present a high impedance to the flow of alternating current to the primary of motor M. Preferably, the system is designed such that this low value of primary current is not quite sufficient to maintain the head end of the conveyor drive at the aforementioned low speed, therefore the head end of the drive decelerates gradually until its speed falls to the value at which contacts LS1 are set to close again, e.g., a speed of about 7% of the rated speed of the drive. When contacts LS1 close, relay TC is re-energized thereby closing its contacts TC1 and saturating current is again applied to the reactors, whereupon the flow of alternating current to the primary of the motor increases causing the motor to accelerate under its load. The motor has now been returned to full control by device AS and circuits CC, MRC and MR, and as a result it accelerates head end 54 of conveyor C until the speed is reached at which switch LS re-opens its contacts LS1, after which the head end of the conveyor drive coasts again until is speed drops to the value at which contacts LS1 re-close. This alternate acceleration and deceleration of the head end of the conveyor drive continues until the tail end of the conveyor reaches the predetermined speed at which switch TS is set to close its contacts TS1, whereupon there is established between points 57 and 58 a circuit which by-passes contacts LS1 and brings contacts AS1, relay AR and relay TC into operation for full control of the motor for the remainder of the starting cycle. Once the drive reaches full speed, contacts S1 to S3 are opened and contacts R1 to R3 closed in the way described earlier; the primary of motor M is now connected directly to power lines L1 to L3. The speed at which switch TS is set to close its contacts TS1 may be the same or a little below the speed at which switch LS is set to open its contacts LS1.

The use of speed switches in the control system ensures that the pulley at the tail end of the conveyor belt is running at a certain speed before the drive pulley at the head end of the belt is allowed to advance in speed beyond a fraction of the full speed of the drive. In other words, the head end pulley must wait until the entire belt is in motion before it can be brought up to full speed. This method of starting is applicable in particular to very long belts wherein a great deal of energy can be stored and then released very suddenly when the components at the tail end of the conveyor first begin to move. If a long belt is suddenly snapped into motion, it, other conveyor components and surrounding equipment can be damaged, particularly if the belt happens to be loaded at the time. This system for starting is also useful where a main conveyor belt must be started first after which feeder belts are started in sequence.

Sometimes it is desirable to run the conveyor at a low rate of speed for a short duration of time, i.e., for repairs or testing. This can be done by opening contacts 59 in circuit LSR. Once contacts 59 are open, contacts TS1 in speed switch TS are rendered ineffective in advancing the speed of the drive beyond the slow speed limit governed by speed switch LS. When the need for slow speed operation is over, contacts 59 are re-closed, thereby returning the system to normal starting followed by normal running conditions.

The embodiments of the invention in which an exclusive property or privilege is claimed are defined as follows:

1. A system for starting a heavily loaded three phase induction motor at a controlled rate of acceleration comprising a three phase circuit for supplying alternating current to the primary of said motor; a saturable reactor for at least two of said three primary phases, each reactor having an A.C. winding connected in series with the phase, control windings on said reactors in series with current limiting means; a source of unidirectional current for energizing said series combination of control windings and current limiting means; a relay having a set of electrical contacts connected across said current limiting means; and a device driven by said motor in synchronism therewith and responsive to the rate of acceleration of said motor to actuate electrical contacts in the device at a preset rate of acceleration, said device contacts being connected to control energization of said relay and operative to cause the relay to maintain its contacts closed when the rate of acceleration is below the preset rate and operative to cause the relay to maintain its contacts open when the rate of acceleration is above the preset rate.

2. The system defined in claim 1 wherein a second relay is connected in circuit with said device contacts and has its contacts connected in circuit with said first relay whereby the first relay is energized through the contacts of the second relay and the second relay is energized through the contacts of the device, and said second relay is a very short time delay relay non-responsive to rapid oscillations of said device contacts but responsive to normal opening and closing of said device contacts.

3. A system for starting a three phase induction motor coupled directly to the head end of a conveyor belt for starting therewith comprising a three phase circuit for supplying alternating current to the primary of said motor; a saturable reactor for at least two of said three primary phases, each reactor having an A.C. winding connected in series with the phase, control windings on said reactor in series with current limiting means; a source of unidirectional current for energizing said series combination of control windings and current limiting means; a relay having a set of electrical contacts connected across said current limiting means; a device driven by said head end of the conveyor in synchronism therewith and responsive to the rate of acceleration of the head end of the conveyor to actuate electrical contacts in the device at a preset rate of acceleration, said device contacts being connected to control energization of said relay and operative to cause the relay to maintain its contacts closed when the rate of acceleration is below the preset rate and operative to cause the relay to maintain its contacts open when the rate of acceleration is above the preset rate; a first speed responsive switch driven by said head end of the conveyor and having contacts in a normal first condition and operative to a second condition above a preset first speed, said contacts of the first speed responsive switch being connected in the control circuit so as to render said rate of acceleration device inactive in the control of motor starting and to maintain said relay contacts open when operated to said second condition; and a second speed responsive switch driven by the tail end of the conveyor having contacts connected in the control circuit and operative from a normal first condition to a second condition at a preset second speed a little below said first speed for restoring the control system to its former state under the control of the rate of acceleration device.

4. A system for starting a three phase induction motor coupled directly to the head end of a conveyor belt for starting therewith comprising a three phase circuit for supplying alternating current to the primary of said motor; a saturable reactor for at least two of said three primary phases, each reactor having an A.C. winding connected in series with the phase; a circuit for controlling saturation of said reactor including at least one control winding of each reactor and the normally open contacts of a relay; a source of unidirectional current for energizing said control windings upon closing of said relay contacts; a device driven by said head end of the conveyor in synchronism therewith and responsive to the rate of acceleration of the head end of the conveyor, said device having normally closed contacts opened at a rate of acceleration preset in the device; said device contacts being connected in a circuit with said relay so as to energize the relay when closed and deenergize the relay when open; a first speed responsive switch driven by said head end of the conveyor and having contacts normally closed and opened above a preset first speed, said contacts of the first speed responsive switch being connected in the control circuit so as to maintain said relay deenergized when open; and a second speed responsive switch driven by the tail end of the conveyor having contacts connected in the control circuit and operative from a normally open to a closed condition at a preset second speed a little below said first speed for restoring the relay circuit to its former state under the control of the rate of acceleration device.

5. The system defined in claim 3 wherein a second relay is connected in circuit with said device contacts and has its contacts connected in circuit with said first relay whereby the first relay is energized through the contacts of the second relay and the second relay is energized through the contacts of the device, and said second relay is a very short time delay relay non-responsive to rapid oscillations of said device contacts but responsive to normal opening and closing of said device contacts.

6. The system defined in claim 4 wherein a second relay is connected in circuit with said device contacts and has its normally open contacts in circuit with said first relay whereby the first relay is energized through the contacts of the second relay and the second relay is energized through the contacts of the device, and said second relay is a very short time delay relay non-responsive to rapid oscillations of said device contacts but responsive to normal opening and closing of said device contacts.

References Cited
UNITED STATES PATENTS

| | | | |
|---|---|---|---|
| 2,330,489 | 9/1943 | Heart et al. | 318—461 XR |
| 2,722,647 | 11/1955 | Esselman et al. | 318—229 XR |
| 2,764,724 | 9/1956 | Dragonetti et al. | 318—397 XR |
| 2,772,384 | 11/1956 | Unterreiner | 318—229 |

ORIS L. RADER, *Primary Examiner.*

G. RUBINSON, *Assistant Examiner.*